J. J. HARPER.
EGG TESTER.
APPLICATION FILED JUNE 13, 1913.
1,108,364.
Patented Aug. 25, 1914.
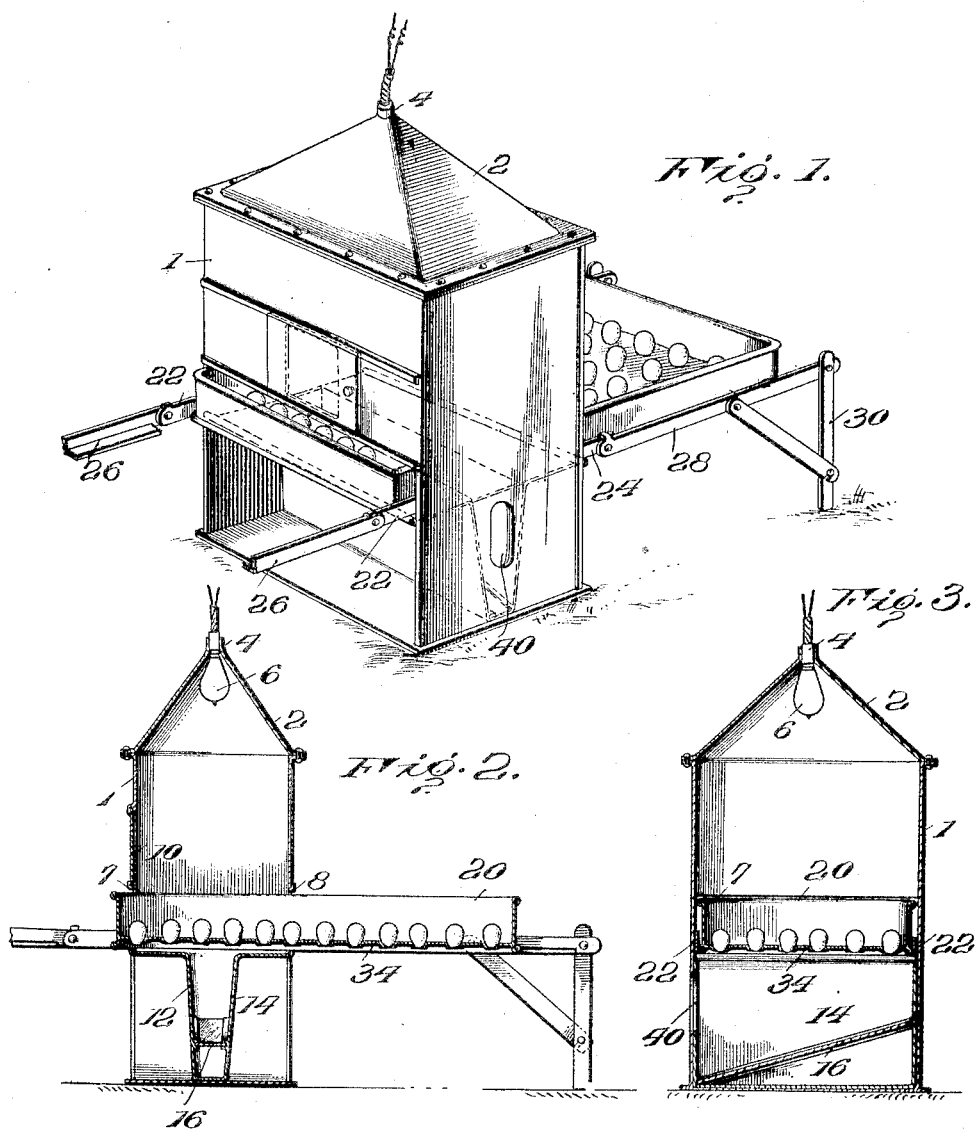
Witnesses
W. A. Williams
H. L. Imirie
Inventor
James J. Harper.
By Robertson & Johnson
Attorneys

UNITED STATES PATENT OFFICE.

JAMES J. HARPER, OF DEFIANCE, OHIO.

EGG-TESTER.

1,108,364.     Specification of Letters Patent.     Patented Aug. 25, 1914.

Application filed June 13, 1913. Serial No. 773,452.

*To all whom it may concern:*

Be it known that I, JAMES J. HARPER, a citizen of the United States, and a resident of Defiance, in the county of Defiance and State of Ohio, have invented certain new and useful Improvements in Egg-Testers, of which the following is a specification.

This invention relates to improvements in egg testers and the object of my invention is to provide a device in which a tray or other support for eggs may be moved so as to carry a plurality of eggs between a source of light and a mirror or other reflecting surface.

The invention consists in the construction and arrangement of parts hereinafter described and then definitely claimed.

In the drawings accompanying and forming part hereof: Figure 1 represents a perspective view of an egg tester constructed in accordance with my invention. Fig. 2 is a longitudinal vertical section. Fig. 3 is a transverse vertical section.

Referring now to the details of the drawings by numerals: 1 designates a casing which may be of any desirable shape, but preferably of the shape shown in the drawings in which there is a top 2 ending in a socket 4 through which may be inserted wires for an electric lamp 6, although it will be understood that any other source of light may be employed. The casing 1 is provided with openings 7 and 8 on opposite sides thereof. Above the opening 7 I prefer to provide a door 10 clearly shown in Figs. 1 and 2. Underneath the openings 7 and 8, I form a framework 12, 14, formed of the shape shown in Fig. 2, and having a narrow portion within which is fitted a narrow mirror 16 which is located directly under the incandescent light 6, as illustrated in Fig. 2. The framework 12, 14, has horizontal portions adapted to support a tray 20 as it is moved through the openings 7 and 8 under the electric lamp 6. To better support and guide the tray 20, I employ tracks or guide-ways 22, 24, on opposite sides of the casing 1, and pivotally connected to these members 22, 24 are foldable sections 26, 28. The sections 28 are shown in full, but the sections 26 in Fig. 1 are broken away. As illustrated, the ends of the sections 28 have foldable legs 30. The construction is such that the tracks or guide-ways 28 may be folded in upright position parallel with the casing and the legs 30 swung over the top 2, in a manner which will be well understood from an inspection of the drawings. The aforesaid tray 20 is provided with a bottom 34 having a number of series of recesses therein, each recess having an opening in its center. The purpose of this construction is to support an egg in the recess and permit light from the incandescent bulb 6 to pass through the egg and through the opening in the recess onto the mirror 16. As illustrated in the drawings, each series is adapted to support six eggs so that as the operator moves the tray 20 through the casing, the light from the incandescent bulb 6 passes directly through one series of six eggs onto the mirror 16 beneath that series of eggs, and the operator can view the results in the mirror 16 through a vertical opening 40 formed in the end of the casing 1 as illustrated in Fig. 1.

It is believed that my invention is so simple that it will be readily understood by those familiar with egg testing devices and no further description of the operation is therefore necessary.

What I claim as my invention is:

1. In an egg tester, a casing having a source of light therein and an opening extending entirely through the casing from one side thereof to the other, a mirror located to receive the rays from the said source of light, and a tray adapted to support eggs constructed to be inserted in one side of the casing and passed therethrough out of the other side of the casing between the source of light and the aforesaid mirror, substantially as described.

2. In an egg tester, a casing having a source of light therein and an opening extending entirely through the casing from one side thereof to the other, a mirror located to receive the rays from the said source of light, a tray adapted to support eggs constructed to be inserted in one side of the casing and passed therethrough out of the other side of the casing between the source of light and the aforesaid mirror, and guide ways in alinement with said opening arranged to guide the tray in its passage through the casing, substantially as described.

3. In an egg tester, a casing having a source of light at the top thereof, openings on opposite sides of the casing, framework within said casing under said openings having a narrow recess provided with a mirror therein, and a tray adapted to support eggs and constructed to pass through said openings over framework whereby the eggs will be moved between the source of light and the aforesaid mirror, the narrow recess with the mirror being of the proper width to light one row of eggs at a time, substantially as described.

4. In an egg tester, a casing having a source of light therein, a mirror located to receive the rays from said source of light, openings in the casing on opposite sides thereof, tracks or guide-ways projecting from said openings, and a tray adapted to support eggs and constructed to be passed through said openings whereby the eggs will be moved between the source of light and the aforesaid mirror, substantially as described.

5. In an egg tester, a casing having a source of light therein, a mirror located to receive the rays from said source of light, openings in the casing on opposite sides thereof, foldable tracks or guide-ways projecting from said openings, and a tray adapted to support eggs and constructed to be passed through said openings whereby the eggs will be moved between the source of light and the aforesaid mirror, substantially as described.

6. In an egg tester, a casing having a source of light therein and having an opening therein extending from one side of the casing to the other, a mirror located to receive the rays from said source of light, foldable guide ways projecting from the openings on the opposite sides of said casing, and a tray adapted to support eggs and constructed to be passed through the opening in said casing from one side thereof to the other, between the source of light and the aforesaid mirror, and guided by said guide ways in such movement, substantially as described.

7. In an egg tester, a casing having a source of light at the top thereof, openings on opposite sides of the casing, framework within said casing under said openings having a narrow recess provided with a mirror therein, tracks or guide-ways on opposite sides of said casing in alinement with said openings, and a tray adapted to support eggs constructed to be passed through said openings over said framework whereby the eggs will be moved between the source of light and the aforesaid mirror, substantially as described.

8. In an egg tester, a casing having a source of light at the top thereof, openings on opposite sides of the casing, framework within said casing under said openings having a narrow recess provided with a mirror therein, tracks or guide-ways on opposite sides of said casing in alinement with said openings, and a tray adapted to support eggs constructed to be passed through said openings over said framework whereby the eggs will be moved between the source of light and the aforesaid mirror said tray having a plurality of series of recesses therein and each recess having an opening therein, substantially as described.

In testimony whereof I affix my signature in presence of two witnesses.

JAMES J. HARPER.

Witnesses:
　C. E. PATTEN,
　GEORGE W. KILLEY.

Copies of this patent may be obtained for five cents each, by addressing the "Commissioner of Patents, Washington, D. C."